United States Patent [19]

Ishihara

[11] Patent Number: 4,909,030

[45] Date of Patent: Mar. 20, 1990

[54] COAL FIRED GAS TURBINE

[75] Inventor: Takao Ishihara, Tokyo, Japan

[73] Assignee: Mitsubishi Jukogyo Kabushiki Kaisha, Tokyo, Japan

[21] Appl. No.: 159,943

[22] Filed: Feb. 24, 1988

[30] Foreign Application Priority Data

Mar. 13, 1987 [JP] Japan .................................. 62-56918

[51] Int. Cl.⁴ .............................................. F02C 3/26
[52] U.S. Cl. .................................. 60/39.464; 60/39.17
[58] Field of Search ............... 60/39.464, 39.12, 39.17; 110/263, 266; 55/406

[56] References Cited

U.S. PATENT DOCUMENTS

| | | | |
|---|---|---|---|
| 2,651,176 | 9/1953 | Yellott | 60/39.464 |
| 2,770,947 | 11/1956 | Ledinegg | 60/39.464 |
| 3,203,175 | 8/1965 | Michalicka et al. | 60/39.464 |
| 4,285,707 | 8/1981 | Pfenninger | 55/406 |
| 4,600,414 | 7/1986 | Metcalfe et al. | 60/39.464 |
| 4,651,520 | 3/1987 | Giertz et al. | 60/39.464 |
| 4,724,780 | 2/1988 | Hoffert et al. | 60/39.464 |

Primary Examiner—Louis J. Casaregola
Assistant Examiner—Timothy S. Thorpe
Attorney, Agent, or Firm—Wenderoth, Lind & Ponack

[57] ABSTRACT

An improved coal fired gas turbine having an enhanced working efficiency and a relatively low manufacturing cost is disclosed, in which a coal-fired furnace, a mist separator, a gas turbine section and an air compressor are sequentially disposed. The gas turbine section and the air compressor are connected by a common shaft with a partition interposed therebetween so that direct communication of gas and air therebetween is prevented. The coal-fired furnace is constructed as a slagging combustor having a heavy thermal load. A molten slag extraction device is provided at the middle portion of the combustor. Air introducing holes communicate with an outlet of the air compressor for controlling the combustion gas. Furthermore, a mist separator for removing ash mist in the combustion gas is provided on the downstream side of the coal-fired furnace, and a combustion gas introducing section of the gas turbine is provided on the downstream side of the mist separator.

3 Claims, 1 Drawing Sheet

COAL FIRED GAS TURBINE

BACKGROUND OF THE INVENTION

1. Field of the Invention:

The present invention relates to a coal-fired gas turbine, and is applicable in a technical field in which solid material such as coal, and is particular fine powder coal, is used as fuel.

2. Description of the Prior Art:

Heretofore, a gas turbine made use of clean fuel such as LNG, heating oil, and the like, and solid fuel such as coal and the like could not be used in the gas turbine because it contains a large proportion of ash.

When coal was to be used as fuel for a gas turbine in the prior art, the so-called coal gasification combined power plant in which coal is gasified in a gasifying furnace and the gas fuel produced is introduced to a gas turbine, was employed. However, such a system is complex and very expensive, and dust removal at a high temperature, desulfurization and denitrification are all under development, and so, this system has yet to be put into practical use. The most serious bar to continuous operation of a gas turbine is the problem of fouling and blocking caused by the ash content of the coal.

With regard to desulfurization and denitrification, a technique which enables such processing even at a low temperature after exhaust from a gas turbine, has been widely put into practical use.

SUMMARY OF THE INVENTION

It is therefore one object of the present invention to provide an improved coal-fired gas turbine which has an enhanced working efficiency and a manufacturing cost that is relatively low.

According to one feature of the present invention, there is provided a coal-fired gas turbine in which a coal fired furnace, a mist separator, a gas turbine section and an air compressor are sequentially disposed. The gas turbine main body and the air compressor are connected by a common shaft with a partition interposed therebetween so that direct communication of gas and air therebetween is prevented. The coal-fired first furnace is constructed as a slagging combustor capable of generating a large thermal load. A molten slag extraction means is provided at the middle portion of the combustor. And, air introducing holes communicating with outlet of the air compressor for controlling combustion gas. Furthermore, a mist separator for removing ash mist in the combustion gas is provided on the downstream side of the coal fired furnace, and a combustion gas introducing section of the gas turbine is provided on the downstream side of the mist separator.

According to the present invention, coal fuel such as pulverized coal, CWM, etc., is directly subjected to heavy load combustion in a slagging combustor (coal fired furnace), whereby 80–90% of the ash content of the coal is converted to a molten state, and 10–20% of the ash assumes the state of a mist with the combustion gas and is removed by a rotary type mist separator or a ceramic filter or the like before the combustion gas enters the gas turbine. Thus, continuous operation of the gas turbine is possible.

In essence, in a coal-fired gas turbine according to the present invention, 80–90% of the ash content of the coal is removed through a slag port in a molten state in the slagging combustor, and the remaining 10–20% of the ash content contained in the combustion gas is removed by the mist separator, and then the combustion gas is introduced to the gas turbine section.

In addition, since a partition is provided between the gas turbine section and the air compressor section, exhaust gas discharged from the gas turbine section does not enter the air compressor.

The coal-fired gas turbine according to the present invention provides the following advantages:

(a) Since pulverized coal, CWM and the like can be used as fuel, a gas turbine combined plant can be constructed, and in contrast to the fact that in the prior art the efficiency was 35–36% (HHV (High Heat Value) reference), according to the present invention the efficiency is improved to about 43%, and therefore, a highly efficient coal-fired plant can be realized.

(b) By integrally constructing a coal-fired furnace serving as a slagging combustor for burning pulverized coal with a gas turbine section, a great reduction in the cost for a coal fired combined system can be realized.

The above-mentioned and other objects, features and advantages of the present invention will become more apparent by referring to the following description of one preferred embodiment of the invention taken in conjunction with the drawings.

BRIEF DESCRIPTION OF THE DRAWINGS

In the accompanying drawings:

FIG. 3b is a cross-sectional view taken along line IIIb—IIIb in FIG. 3a.

DETAILED DESCRIPTION OF THE PREFERRED EMBODIMENT

Now one preferred embodiment of the present invention will be described in greater detail with reference to FIGS. 1, 2, 3a and 3b.

Figure 1:
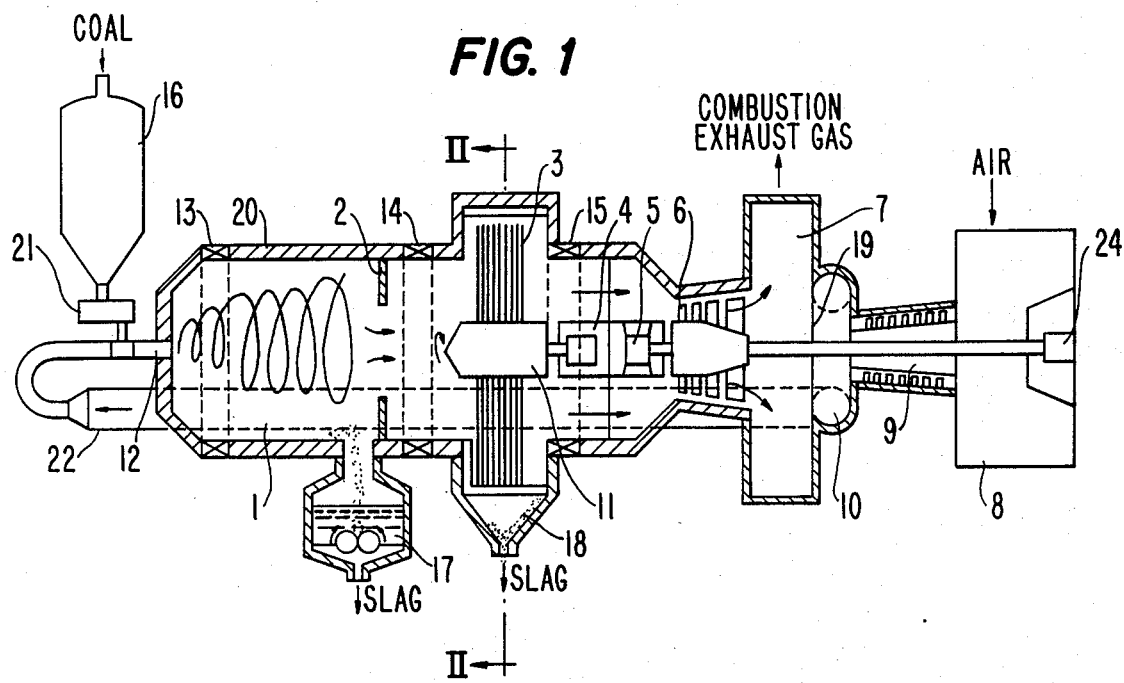
FIG. 1 is a cross-sectional view of a fuel fired gas turbine according to the present invention.
Figure 2:
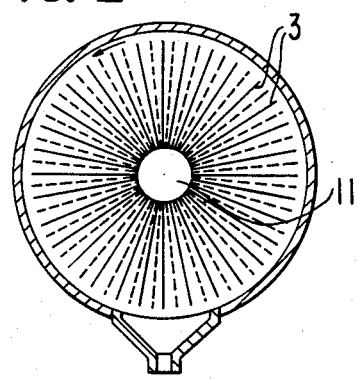
FIG. 2 is a cross-sectional view taken along line II—II in FIG. 1.
Figure 3A:
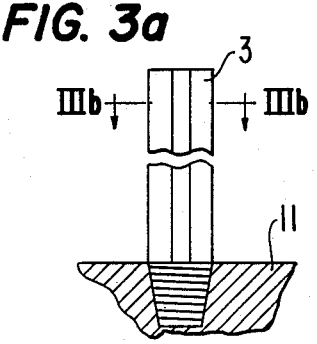
FIG. 3a is a front view of a radial blade in a mist separator of the present invention.
Figure 3B:

Referring to FIG. 1 which shows the general structure of a coal-fired gas turbine according to the present invention, combustion air is introduced through an air intake hole 8, and is passed through an air compressor 9 to be pressurized up to 10–15 atm. Then the compressed air flows from a compressed air delivery port 10 through a high pressure air feed pipe 22, and some of the compressed air is fed to a slagging combustor 1 and an outlet of a mist separator through a swirling secondary air introducing hole 13, a secondary air introducing hole 14 and a tertiary air introducing hole 15, respectively. The remaining air conveys pulverized coal fed through a pulverized coal bin 16 and a pulverized coal feeder 21, and is introduced through a pulverized coal burner 12 into the slagging combustor 1. While the illustrated slagging combustor is a horizontal one, it is possible to employ a vertical slagging combustor, and in the vertical slagging combustor, a lining structure of refractory material is easy to fabricate. Pulverized coal is conveyed into the combustor by primary air, the pulverized coal thrown into the combustor burns furiously as it is made to swirl by the swirling secondary air blown into the combustor at a high speed of about 90–100 m/sec in the tangential direction of the combustor inner cylinder. A burning atmosphere temperature reaches 1500–1600° C. or higher, the ash ($SiO_2$, $Al_2O_3$, MgO, CaO, Fe$_2$O$_3$, etc.) of the pulverized coal becomes molten and flows along a surface of the combustor, and 80–90% of the molten ash is discharged through a slag extraction hole into a molten slag reservoir 17. The remaining 10–20% of the ash flows out of the slagging combustor 1 in a gaseous state or as a mist with combustion gas, and then, after it has been reburnt or has been mixed with secondary air introduced through the secondary air introducing hole 14, it is maintained at an appropriate temperature of about 1100° C. or lower (that is, it is held at a temperature of about 1100° C. or lower when all the ash is in the form of a mist or fly ash). During the period when the ash passes through mist fly ash separator blades 3 with the combustion gas, it adheres to the blades while in a mist, then passes through molten mist introducing grooves 23 (FIG. 3b) extending in the rotating blades and thus, is gradually forced to the outside under centrifugal force and is eventually discharged to a mist slag discharge hopper 18.

The mist fly ash separator comprises a blade group consisting of a large number of blades 3 disposed radially on a rotor 11 that is rotated by a separator drive motor 4. Thus ash mist, fly ash, etc. in the combustion gas strikes against and adhere to these blades, and is removed almost perfectly through the above-mentioned process. It is to be noted that the mist fly ash separator could employ superposed porous ceramic discs, and a suitable rotational speed of such ceramic discs is about 100 rpm. What is most important in this process is to maintain the combustion gas temperature at an appropriate value of 1100° C. or lower and to control the ash mist and fly ash to flow at a constant rate along the blades under centrifugal force. If these conditions cannot be achieved well, the blades will become blocked and continuous operation will be impossible. The combustion gas passed through the mist fly ash separator blades 3 mixes with air fed through the tertiary air introducing hole 15 and has its temperature lowered further. Hence, the combustion gas does not excessively heat up the separator drive motor 4 and the gas turbine bearing. After the combustion gas is introduced at a predetermined temperature to the gas turbine main body 6 it is led to a combustion exhaust gas port 7. In addition, a partition 19 is disposed between the combustion exhaust gas port 7 of the gas turbine section and the air compressor section so as to prevent the combustion exhaust gas of the gas turbine section from being introduced to the air compressor 9. Furthermore, the slagging combustor 1, the mist fly ash separator section, the gas turbine section, and the air compressor section are integral as illustrated in FIG. 1, and therefore, a large reduction in the cost for the entire system can be realized.

Since many changes and modifications can be made to the above-described construction without departing from the spirit of the invention, it is intended that all matter contained in the above description and illustrated in the accompanying drawings shall be interpreted as illustrative of the invention and not limitative thereof.

What is claimed is:

1. A coal-fired gas turbine comprising:
   a coal-fired furnace, a mist separator section, a gas turbine section and an air compressor section having an outlet, sequentially disposed in the foregoing order in the coal-fired gas turbine;
   said coal-fired furnace being a slag combustor for generating a thermal load capable of breaking down coal, said slag combustor including an inlet and an air introducing hole open at said inlet and to the outlet of said air compressor section;
   molten slag extraction means connected to said slag combustor for extracting slag from said combustor;
   said mist separator section having an inlet open to said combustion furnace, and an air introducing hole open at the inlet of said mist separator section for introducing air into said inlet that maintains combustion gas passing from said slag combustor to said mist separator section at a predetermined temperature;
   a rotor having a plurality of separator blades extending radially therefrom disposed in said separator section and rotatable for removing ash from mist containing the ash and combustion gas introduced into said mist separator section from said slag combustor;
   drive means operatively connected to said rotor for rotating said rotor;
   a main body of a gas turbine disposed in said gas turbine section, and said gas turbine section including an inlet and an air introducing hole open to the inlet of said gas turbine section and to the outlet of said air compressor section;
   said air compressor section having an outlet open to said air introducing hole;
   an air compressor disposed in said air compressor section for compressing air passing to the outlet of said air compressor section;
   a common shaft extending between and connected to the main body of said turbine and said air compressor; and
   a partition disposed between said gas turbine section and said air compressor section for preventing the communication of combustion of combustion gas driving said main body of said turbine with air compressed by said air compressor.

2. A coal-fired gas turbine as claimed in claim 1, wherein each of said separator blades has a groove extending therealong in a direction that is radial with respect to said rotor.

3. A coal-fired gas turbine as claimed in claim 1, wherein the inlet of said mist separator section is integral with and extends directly from said coal-fired furnace, said gas turbine section includes an inlet integral with and extending directly from said mist separator section a combustion gas introduction section is integral with and extends directly between said mist separator section and said gas turbine section, and said air compressor section is integral with and extends directly from said gas turbine section.

* * * * *